United States Patent [19]

Redford

[11] 3,878,090

[45] Apr. 15, 1975

[54] DENSE SOLVENT DEMULSIFICATION METHOD FOR BITUMINOUS PETROLEUM-WATER EMULSIONS

[75] Inventor: David Arthur Redford, Fort Saskatchewan, Calif.

[73] Assignee: Texaco Exploration Canada Ltd., Calgary, Alberta, Calif.

[22] Filed: Sept. 27, 1973

[21] Appl. No.: 401,528

[52] U.S. Cl. .............................................. 208/188
[51] Int. Cl. ............................................ C10g 33/04
[58] Field of Search ...................... 208/188, 187, 11

[56] References Cited
UNITED STATES PATENTS

| | | | |
|---|---|---|---|
| 3,135,681 | 6/1964 | Pflasterer | 208/188 |
| 3,505,307 | 4/1970 | Foehr | 208/188 |
| 3,695,354 | 10/1972 | Dilgren et al. | 208/11 |

*Primary Examiner*—Delbert E. Gantz
*Assistant Examiner*—G. J. Crasanakis
*Attorney, Agent, or Firm*—T. H. Whaley; C. G. Ries

[57] ABSTRACT

Resolving or breaking oil field emulsions involving bituminous petroleum is more difficult than emulsions involving conventional petroleum because the specific gravity of bituminous petroleum is approximately equal to the specific gravity of water. Demulsification of bituminous petroleum emulsions is aided by adding a solvent for the bitumen whose specific gravity is substantially greater than the specific gravity of water to the emulsion. Examples of suitable solvents include carbon disulfide, carbon tetrachloride, and certain halogenated hydrocarbons which are essentially insoluble in and unreactive with water.

9 Claims, No Drawings

DENSE SOLVENT DEMULSIFICATION METHOD FOR BITUMINOUS PETROLEUM-WATER EMULSIONS

BACKGROUND OF THE INVENTION

I. Field of the Invention

This invention relates to a method for breaking water-in-oil or oil-in-water emulsions wherein the specific gravity of the oil component is very nearly equal to the specific gravity of water such as bituminous petroleum obtained from tar sand deposits.

II. Prior Art

Although petroleum and water are essentially immiscible over a wide range of temperatures and pressures, they often attain a condition of intimate and apparently permanent emulsification. A generally accepted theory for the formation of such stable emulsions is the presence in the emulsion of a third substance, termed an "emulsifying agent." Minute particles or molecules of this "emulsifying agent" accumulate at the interface between the continuous and discontinuous phases of the emulsion. The emulsifying agent may be either a finely divided calloidal substance such as silica or clays which are insoluble in oil and water or a surface active material which is soluble in either oil or water.

Two types of emulsions are encountered in petroleum operation, which are generally known as water-in-oil emulsions and oil-in-water emulsions. Naturally occurring crude petroleum emulsions are nearly always of the water-in-oil type, although the inverted type is sometimes encountered.

In situ recovery processes for tar sand deposits or other viscous petroleum containing formations frequently give rise to the creation of oil-in-water emulsion. For example, a popular in situ recovery process especially applicable to tar sand deposits involves injecting steam and an alkaline material such as sodium hydroxide into a horizontally oriented fracture or permeable zone in the formation. A small amount of surfactant may be incorporated into the steam to promote formation of an oil-in-water emulsion, although ordinarily bituminous petroleum spontaneously emulsifies to form a fairly stable oil-in-water emulsion. The reason for formation of an oil-in-water emulsion is the fact that the bituminous petroleum fraction of the tar sand deposit is essentially solid and immobile at reservoir conditions, whereas an oil-and-water emulsion formed from the bituminous petroleum is a fluid having a viscosity only slightly greater than the viscosity of water.

In in situ recovery operations involving steam emulsification drives such as are described above, the fluid being produced from production wells is a stable oil-in-water emulsion. The oil-in-water emulsion is normally treated with an acid, which results in separating the emulsion into water and a water-in-oil emulsion. This latter water-in-oil emulsion is exceedingly difficult to break, especially when the petroleum fraction is bituminous petroleum, the specific gravity of which is very nearly equal to the specific gravity of water.

In situ combustion is another popular type of secondary recovery process used in viscous oil formations and tar sand deposits. Any oxidative reaction results in formation of organic acids. Such natural acids break any oil-in-water emulsions formed, so any emulsions formed are of the more stable and more difficult to break water-in-oil type.

In near surface tar sand deposits economically suitable for strip mining or surface mining, separation of the bitumen and sand is accomplished in equipment located on the surface. Frequently, the separation technique employs aqueous solutions, and formation of an emulsion between water from the aqueous solution and bitumen recovered from the mined tar sand frequently results. Accordingly, separation of emulsions of bituminous petroleum and water are frequently necessary in plants processing bitumen mined by strip mining techniques.

Since conventional petroleum and water are immiscible, and the interfacial tension between petroleum and water is high, spontaneous separation into two separate phases normally occurs spontaneously if no emulsifying agent is present. Since the specific gravity of conventional petroleum is usually 20 or 30% less than the specific gravity of water, separation of oil-in-water into two discrete zones, oil floating on top of the water, occurs rather easily. Although bituminous petroleum and water are equally immiscible and the interfacial tension existing between bituminous petroleum and water is sufficiently high to cause one to expect spontaneous separation, practical separation of bituminous petroleum and water is complicated considerably by the similarity in specific gravities of the two materials. The specific gravity of bitumen is very slightly greater than the specific gravity of water at temperatures below 100°F. The specific gravities of bitumen and water are equal at about 100°F. and at about 240°F. The maximum differences in gravity occurs in the range of 150° to 170°F., and below about 50°F. Even if the temperature can be controlled so as to provide this maximum density difference, the magnitude of the difference is insufficient to promote rapid separation of oil and water. Accordingly, even if chemical additives are utilized which can effectively resolve the surface forces responsible for the stability of emulsions, which renders the emulsion otherwise amenable to separation into the separate phases, separation is actually difficult to achieve because of the similarity in specific gravity.

In view of the foregoing, it can be readily appreciated that there is a substantial commercial need for a method for breaking or resolving oil-in-water or water-in-oil emulsions wherein the specific gravity of the oil is very nearly equal to the specific gravity of water.

SUMMARY OF THE INVENTION

I have discovered, and this constitutes my invention, that separation of emulsions, especially those involving bituminous petroleum whose density is very nearly the density of water, is greatly enhanced by adding to the bituminous petroleum containing emulsion, a material which is soluble in the bituminous petroleum and insoluble in water, and which material has a specific gravity substantially greater than the specific gravity of water. The material partitions exclusively into the bituminous petroleum phase, which reduces the viscosity and increases the specific gravity of the bituminous petroleum phase substantially. The result is an emulsion in which the bituminous petroleum viscosity is reduced and its density is made substantially greater than the density of water. Such an emulsion is highly unstable and spontaneously resolves itself into two separate phases, with water being on top of the dense solvent containing bituminous petroleum phase. The preferred solvents for use in this invention include carbon disulfide carbon tetrachloride and certain halogenated hydrocarbons which are essentially insoluble in and unreactive with water, such as trichloromethane.

DESCRIPTION OF THE PREFERRED EMBODIMENTS

Briefly stated, the process of my invention involves separation of emulsions between water and bituminous petroleum whose specific gravity is very near the specific gravity of water, by adding to the emulsion a material which is miscible with or soluble in the bituminous petroleum but is insoluble in water and which material also has a specific gravity substantially greater than the specific gravity of water.

Bitumen or bituminous petroleum such as is found in the so called tar sand deposits has a specific gravity very near the specific gravity of water over a fairly broad range of temperatures. The significance of the similarities in specific gravity of bitumen and water lies in the fact that even if surface forces promoting emulsification are resolved by chemical additives, the force of gravity cannot be relied upon to promote rapid separation of the insoluble phases into discrete layers. Although the effect of the forces generated by gravity acting in consequence of the specific gravity differs between petroleum and oil are not normally discussed in demulsification technology, the forces are always present and contribute significantly to rapid separation of oil and water emulsions. Since the speed of separation is of critical importance in any commercial process, some additional treatment beyond the surfactant demulsification treatment normally utilized must be applied to an emulsion of bituminous petroleum and water. In conventional demulsification, two techniques frequently used to accelerate the separation phenomenon are heating of the emulsion and centrifuging. Heating is resorted to principally to reduce the viscosity of the water immiscible materials which promotes separation, whereas centrifugation accents the forces resulting from the specific gravity differences between the immiscible phases. Neither heating nor centrifugation will enhance the separation of bituminous petroleum from water, since the specific gravity of bituminous petroleum and water are nearly equal over a large temperature range. In some instances the problem of resolving an emulsion can be aggrevated by heating, since, for example, heating the emulsion at a temperature below 100° to a temperature of 100°F. will result in eliminating even the slight difference in specific gravity existing between water and bituminous petroleum, since the specific gravity versus temperature curves for bitumen and water cross at 100°F.

In the process of my invention, a material which is miscible or soluble in oil and which has a specific gravity substantially greater than the specific gravity of water is added to the emulsion of bituminous petroleum and water. The solvent may be added to an oil-in-water emulsion or to a water-in-oil emulsion with equally beneficial results. Since the materials are chosen so as to be highly soluble in the bituminous petroleum and essentially insoluble in water, all of the material added to the emulsion dissolves in the bituminous petroleum phase, whether that is the continuous or discontinuous phase of the emulsion.

Any solvent for the bituminous petroleum which is insoluble in water, and whose specific gravity is greater than the specific gravity of water may be used in the process of my invention. The material tabulated in Table I below are preferred dense solvents, since they are readily available, comparatively inexpensive, and meet the criteria of solubility in bituminous petroleum and specific gravity higher than the specific gravity of water (e.g. higher than 1.0).

TABLE I

| Specific Gravities of Solvents | |
|---|---|
| Compound | Specific Gravity |
| Carbon Disulfide ($CS_2$) | 1.263 |
| Carbon Tetrachloride $CCl_4$ | 1.595 |
| Trichloromethane $CHCl_3$ | 1.498 |
| Dichloromethane $CH_2Cl_2$ | 1.336 |
| Trichloroethane $CH_3-C-Cl_3$ | 1.325 |

Generally speaking, the most effective solvent for use in this particular process would be the solvent with the highest specific gravity. Obviously, compounds such as di- or tri-bromomethane or di- or tri-iodomethane would have specific gravities higher than those tabulated in Table I; however, the cost and availability of such materials is such as to make their use impractical in large scale operations. Accordingly, the preferred solvents for practical application of the process of my invention include carbon disulfide, carbon tetrachloride, trichloromethane, dichloromethane or trichloroethane.

Generally, the ratio of dense solvent to emulsion can vary from about .01 to about 10 in order to promote rapid separation of the phases.

It should be emphasized that the addition of the above-described dense solvents frequently results in rapid separation of an otherwise stable emulsion without any additional treatment. However, addition of the above-described dense solvents may be supplemented by chemical demulsification treatments, as well as heating and centrifuging in order to assist resolving very stable bituminous petroleum-water emulsions.

In application of this process to separation of oil-in-water emulsions such as are produced by the steam emulsification drive process, the oil-in-water emulsion may first be treated with an acid to resolve the emulsion into water in a water-in-oil emulsion which may contain up to 50% water. The water-in-oil emulsion may then be treated with the dense solvent to resolve it into water and oil.

The amount of dense solvent required to resolve a particular bituminous petroleum-water emulsion is not predictable with accuracy since it will depend on a number of variables. For example, the treating temperature, the type and quality of bituminous petroleum crude, the salt content of the water, the nature and amount of artifical emulsifiers present, and the relative quantities of oil and water in the emulsion, are among the major variables which directly affect the quantity of dense solvent needed to break a particular emulsion. Additionally, in the instance of application of this process to emulsions being produced in a steam emulsification drive recovery process, caustic and chemical emulsifiers may have been added to the steam injected into the formation for the purpose of promoting the formation of an oil-in-water emulsion, and the type and quantity of such emulsifiers present in the crude also affect the amount of dense solvent necessary to achieve rapid separation of the phases.

Tests well known in the art of evaluating demulsifying chemicals may be applied in the practice of the process of my invention for the purpose of determining the optimum choice of dense solvent and the optimum amount of solvent to add to a particular emulsion. A minimum of equipment is required and the tests results are available in a very short period of time. The most commonly employed test is the so-called "bottle test," which may be advantageously employed in field implementation of the process of my invention. The test is described in Chapter IX of "Treating Oil Field Emulsions," Petroleum Extension Service of the University of Texas, Second Edition (1955). Briefly, this test involves adding varying amounts of the treating solution to 100 ml. samples of an emulsion to determine the effectiveness of the treating solution and a minimum quantity of demulsifier necessary to break the emulsion. The sharpness and extent of resolution of the emulsion and the clarity of the separated phases are determined visually.

In applying the above-described test to determine the amount and type of dense solvent to be added to a particular emulsifier, it is preferable to try several of the above solvents and to vary the treating pattern from about 5 to about 25% by volume over several increments, and to observe the sharpness and extent of resolution of the emulsion and the clarity of the separated phases.

It should be noted that using less than the minimum effective quantity of dense solvent as determined by the bottle test will not produce a resolution of the emulsion. Applying more than the minimum amount determined by the bottle test will neither improve the demulsification process itself nor produce oil of superior quality. Thus in this instance, the minimum of dense solvent determined by the bottle test to be adequate to break an emulsion is also the optimum amount to use, taking into consideration, of course, the reproducibility of the bottle test and the ability of the treating equipment in the field to add precise quantities of the demulsifying solution to the emulsion.

The following examples further serve to illustrate the process of my invention and the preferred methods for practicing the invention, but should not be construed as limitative or restrictive of the invention.

FIELD EXAMPLE I

A tar sand deposit is being exploited by a steam emulsification drive process, wherein 85% quality steam containing 0.2% sodium hydroxide is injected into a series of injection wells through perforations made in the wells, the steam and caustic passing through horizontal pancake fractures previously formed in the lower portion of the tar sand deposit and connecting with a series of production wells spaced about a hundred feet from the injection wells. The injected steam and caustic contact bitumen in the tar sand deposit immediately above the fracture and forms an oil-in-water emulsion therewith having a viscosity of only about 0.5 centipoise at the temperature existing within the communication path. The fluid being produced from the production wells is an oil-in-water emulsion. The temperature of the emulsion is 175°F., and the oil content is 12% by volume.

Numerous tests involving commercially available demulsifiers have proven to be essentially unsuccessful for the purpose of resolving the produced emulsion at a rate adequate for use in the field project. Although laboratory samples indicate any one of a number of commercially available demulsifiers can produce the desired surface force changes necessary to permit resolution of the immiscible phases, separation is very slow because the specific gravities of the fluids are nearly equal. At the temperature at which the emulsion is being produced at the surface, the specific gravity of the aqueous phase, a low concentration saline solution is 1.05, and the specific gravity of the bituminous petroleum phase of the emulsion is 1.073.

Tests are conducted to determine the suitability of carbon tetrachloride as an additive to the emulsion for the purpose of increasing the extent and rate of separation thereof. "Bottle Tests" are performed in which 2, 8, and 20% by volume carbon tetrachloride is added to the produced emulsion. Little effect is achieved at 2% and relative complete separation is achieved by utilizing both 8 and 20% by volume. Additional tests are performed utilizing 4 and 6% by volume levels of carbon tetrachloride, and it is determined that the optimum treating level for this particular emulsion is about 4% by volume. Accordingly, mixing equipment is installed for continually mixing carbon tetrachloride with the produced emulsion at the rate of about 4% by volume, so as to increase the specific gravity of the bituminous petroleum discontinuous phase of the produced emulsion in order to cause spontaneous, complete resolution. The emulsion is cooled to 135°F. prior to being contacted with carbon tetrachloride since carbon tetrachloride boils at 140°F.

Since carbon tetrachloride boils at atmospheric pressure at 140°F., it is decided to separate the carbon tetrachloride from bitumen once separation of the two phases of the emulsion is accomplished. This is readily accomplished by a simple heating separation equipment, which causes carbon tetrachloride to boil out of the solution of carbon tetrachloride and bituminous petroleum, after which carbon tetrachloride is cooled sufficiently to recondense it to a liquid so that it may be recycled into the production stream. This greatly reduces the total quantity of carbon tetrachloride necessary, which reduces the solvent cost of the process materially.

FIELD EXAMPLE II

A shallow tar sand deposit is being exploited by strip mining, the excavated bituminous petroleum-sand mixture being removed and transported mechanically to a surface located separation plant. The separation of bitumen and petroleum results in the inadvertent production of a water-in-oil emulsion, the continuous phase of which is bituminous petroleum and the discontinuous phase of which is water having dissolved therein a small amount of sodium chloride and trace amounts of sodium hydroxide. Attempts to resolve the water-in-oil emulsion by conventional demulsification technology are unsuccessful, because the specific gravity of the bituminous petroleum and the aqueous solution are essentially equal.

The emulsion is subjected to a series of bottle tests to determine the suitability of carbon disulfide as a dense solvent to facilitate resolving this very stable emulsion. Tests employing 5, 10, 15, 20, 25 and 30% by volume carbon disulfide indicate separation is enhanced by addition thereto at least 20% by volume carbon disulfide. The tests further indicate that once an adequate amount of solvent is added, no additional treatment with chemicals or other means is necessary, since the separation occurs essentially spontaneously. Separation is fairly clean, with the aqueous phase floating on top of the denser mixture of bituminous petroleum and carbon disulfide.

Since a substantial quantity of carbon disulfide is used in this particular instance, separation and reuse of the dense solvent is important if the process is to be economically feasible. Carbon disulfide is readily separated from the solution of bituminous petroleum and carbon disulfide by means of heating or vacuum distillation or both. Since carbon disulfide boils at atmospheric pressure at 114°F., the solution of bituminous petroleum and carbon disulfide is pumped into a vessel and heated to 120°F., which results in rapid and essentially complete evolution of carbon disulfide from the bituminous petroleum. Carbon disulfide vapors are cooled in an ambient air heat exchanger and recondensed to a liquid form for immediate recycling into the separation stream, and the bituminous petroleum containing essentially no carbon disulfide is then piped to surface refining facilities.

EXPERIMENTAL SECTION

In order to verify the operability of my invention, and further to determine the optimum concentrations of dense solvent, the following laboratory experiments were performed.

An oil-in-water emulsion produced by a laboratory steam flood was used in this test. A 900 ml. sample of the produced fluid was allowed to separate spontaneously, resulting in 118 ml. of a water-in-oil emulsion containing 60% water and 782 ml. of an oil-in-water emulsion containing 0.23% bitumen. To the water-in-oil emulsion was added 500 ml. of carbon disulfide and the mixture was shaken vigorously and allowed to set quiescent for 24 hours and the water layer on top was decanted. After setting another 24 hours and decanting, the solvent was evaporated from the bitumen solvent solution at room temperature. Forty-nine grams of bitumen were obtained containing less than 0.01% water.

A different, oxidative type process resulted in production of water and a water-in-oil emulsion which resembled pure bitumen but which actually contained 61% water and only 39% bitumen. Water was decanted and an equal weight of carbon disulfide was added to the water-in-oil emulsion. The mixture was stirred and allowed to separate by gravity at room temperature. After three hours most of the water had separated out as a relatively clear layer on top of the bitumen. After 24 additional hours only slightly more water had entered the water layer. A sample of bitumen from the lower level was analyzed by the Karl Fischer technique and found to contain only 2.6 % water. This level could be reduced further by centrifuging if necessary.

Thus I have disclosed in the foregoing that emulsions of water and bituminous petroleum having very near the same specific gravity as water may be quickly resolved by adding to the emulsion a material whose specific gravity is substantially greater than the specific gravity of water, and which material is readily soluble in the bituminous petroleum but essentially insoluble in water.

While numerous illustrative embodiments of the process of my invention have been described for illustrative purposes, my invention is by no means limited to such embodiments since many variations of the process disclosed herein will be apparent to persons skilled in the related arts without departing from the true spirit and scope of my invention. Similarly, while a mechanism has been proposed to explain the benefit resulting from use of my invention, I do not wish to be limited to any particular mechanism or theory of operation. It is my intention that my invention be limited only by such limitations and restrictions as are imposed by the appended claims.

I claim;

1. A process for resolving an emulsion of water and bituminous petroleum, the specific gravity of the bituminous petroleum being essentially the same as the specific gravity of water, comprising, contacting said emulsion with a treating material which is soluble in the bituminous petroleum and essentially insoluble in water, the treating material being selected from the group consisting of carbon disulfide, carbon tetrachloride, chlorinated methane, chlorinated ethane and mixtures thereof, wherein the volume ratio of treating material to emulsion is from about .01 to about 10.0.

2. A method as recited in claim 1 wherein the treating material is carbon disulfide.

3. A method as recited in claim 1 wherein the treating material is carbon tetrachloride.

4. A method as recited in claim 1 wherein the chlorinated methane treating material which is essentially insoluble in water is trichloromethane.

5. A method as recited in claim 1 wherein the chlorinated ethane treating material which is essentially insoluble in water is trichloroethane.

6. A method as recited in claim 1 wherein the emulsion is an oil-in-water emulsion.

7. A method as recited in claim 1 wherein the emulsion is a water-in-oil emulsion.

8. A method as recited in claim 1 wherein the emulsion is also heated to facilitate separation of the phases.

9. A method as recited in claim 1 comprising the additional step of contrifuging the emulsion to resolve it into its components.

* * * * *